United States Patent
van Geel et al.

(10) Patent No.: US 6,459,747 B1
(45) Date of Patent: Oct. 1, 2002

(54) METHOD FOR THE QUANTITATIVE DETERMINATION OF THE FISSILE MATERIAL CONTENT IN SMALL SIZE PARTICLES

(75) Inventors: Jacobus van Geel, Ettlingen-Oberweier (DE); André Lagerwaard, Capelle aan den Ijssel (NL)

(73) Assignee: European Community (EC), Luxembourg (LU)

( * ) Notice: Subject to any disclaimer, the term of this patent is extended or adjusted under 35 U.S.C. 154(b) by 0 days.

(21) Appl. No.: 09/555,491

(22) PCT Filed: Nov. 5, 1998

(86) PCT No.: PCT/EP98/07605

§ 371 (c)(1), (2), (4) Date: Jun. 1, 2000

(87) PCT Pub. No.: WO99/28766

PCT Pub. Date: Jun. 10, 1999

(30) Foreign Application Priority Data

Dec. 2, 1997 (EP) ............................................. 97121136

(51) Int. Cl.$^7$ ............................... G21G 1/06; G01T 5/02
(52) U.S. Cl. .................. 376/159; 250/473.1; 250/472.1
(58) Field of Search ................................ 376/159, 257, 376/154, 253; 250/390.03, 390.04, 472.1, 473.1, 474.1

(56) References Cited

U.S. PATENT DOCUMENTS

| | | | |
|---|---|---|---|
| 4,900,935 | * 2/1990 | Roberts et al. | 250/472.1 |
| 4,975,574 | * 12/1990 | Lucas | 250/253 |
| 5,087,407 | 2/1992 | Gold et al. | 376/159 |
| 5,267,274 | * 11/1993 | Donelick | 376/164 |

OTHER PUBLICATIONS

Imori et al., "A New Scanning System for Large Area Track–Etch Detectors" (Feb. 1987), Elsevier Science Publishers B. V., Nuclear Instruments and Methods in Physics Research, B18, No. 3, pp. 307–310.*

Durante M et al: "Nuclear Track Detectors in Cellular Radiation Biology" Radiation Measurements, vol. 26, No. 2, Mar. 1, 1996, pp. 179–186.

Harrison, K.G: "a neutron dosimeter based on 237Np fission" Nuclear Instruments & Methods, vol. 157, No. 1, Nov. 1978, pp. 169–178.

Birkholz et al: "Uranium Measurements with SSNTDS for Environmental Protection" International Journal of Radiation Applications and Instrumentation Part D: Nuclear Tracks and Radiation Measurement, vol. 18, No. 4, Jan. 1, 1991, pp. 403–406.

Iyer R H et al: "application of the fission trackregistration technique in the estimation of fission materials:/ sup 235/ u–content in natural and depleted uranium samples and total uranium in solutions" Nuclear Instruments and Methods, vol. 109, No. 3, Jun. 15, 1973, pp. 453–459.

International Search Report.

* cited by examiner

Primary Examiner—Michael J. Carone
Assistant Examiner—Daniel Matz
(74) Attorney, Agent, or Firm—Sughrue Mion, PLLC

(57) ABSTRACT

A method is provided for the quantitative determination of fissile material content in small size particles present in samples. The samples are sandwiched in organic sheets and then submitted to a defined thermal neutron fluence whereupon fission products of the fissile material in the sample create in the sheets fission tracks which are rendered visible by etching the sheets. Then the size of selected particles having created such tracks is. determined by means of a microscope and thereafter these visible tracks of the selected particles are compared to pre-established standard tracks obtained by the same process from particles of different stepped known size and enrichment ratio.

4 Claims, 2 Drawing Sheets

10μm 30kV

METHOD FOR THE QUANTITATIVE DETERMINATION OF THE FISSILE MATERIAL CONTENT IN SMALL SIZE PARTICLES

The invention relates to a method for the quantitative determination of the fissile material content in small size particles which are present in samples such as environmental samples.

In order to detect non-declared nuclear activities in nuclear or non-nuclear installations environmental samples inside and/or outside suspected installations must be taken and analyzed in order to detect their fissile material content beyond or below the natural enrichment rate. The isotopic ratio U-235/U-238 which in nature amounts to 0.7:99.3 is particularly significative for such verifications.

Usually this ratio is measured by means of a mass spectrometry process. However, this method is cumbersome, requires a clean laboratory for the preparation of the environmental samples in view of the analysis and destroys the sample.

Therefore there is a need for a quick and cheap screening method since many of the environmental samples do not contain any fissile material besides natural uranium and thorium. A pre-screening of the environmental samples in order to discard from further analysis all samples without fissile material and samples containing only natural uranium and thorium would allow a severe reduction of the mass spectrometry operations.

In the frame of uranium mining a method has been conceived which allows the estimation of the natural uranium content in rock samples or in solutions and which is known as "Solid State Fission Track" process. This method is for example described in the periodical NUCLEAR INSTRUMENTS AND METHODS 109 (1973) pages 453 to 459. According to this method a rock sample to be analyzed is sandwiched between sheets of certain organic materials and submitted to a defined thermal neutron flux. Since among the uranium isotopes only U-235 is fissionable by thermal neutrons, fission tracks created in the sheets by fission products reveal the presence of U-235. The track density found on these sheets depends on the content of U-235 in the sample.

It is an aim of the present invention to propose a method of the type defined above which allows a quick and cheap screening of the environmental samples on single particles of suspect material. This reduces considerably the number of mass spectrometry operations.

This method is defined in the appended claim 1.

Preferably a standard chart is used for the interpretation of the tracks, this chart containing, in a columns and lines arrangement, images of fission tracks from standard particles of stepped known size and of different stepped known enrichment ratios. Since the number of tracks (or track density) depends on the size of the particle and on its enrichment ratio, tracks created by a particular particle emerge reveal the identification of said particle.

At first, its size is measured by means of an optical or electron microscope. Further, the density of tracks associated to this particle is compared for that given size with the corresponding density of an image of the chart. The resulting type of fissile material and its enrichment ratio can be read directly from the chart.

The invention will now be described in more detail by means of a preferred embodiment and the attached drawings.

During the inspection of suspect installations samples of different kinds are taken, such as smear samples from surfaces or dust samples from air filters. They are sealed on the spot between sheets of organic material such as polycarbonate, which are sufficiently transparent for allowing later-on the size measurement by means of a microscope and which are altered by the fission products of actinides contained in the sample. The sample quantity should preferably be in the range of 1 to 10 mg. It might therefore be useful to collect a large number of samples on successive portions of a common carrier tape which after sealing sample-by-sample can be enrolled on a reel similar to that of a movie film. The different individual "pictures" can be associated to a data track similar to the sound track on a movie film tape. This track stores data concerning the identification and the place of origin of the respective sample.

As soon as the entire spool has been charged with samples it can be transferred to a neutron irradiation facility. The neutron fluence and the irradiation time are adjusted conveniently in order to obtain a number of tracks or "stars" of tracks on the sheets which can be easily analyzed.

Figure 2:
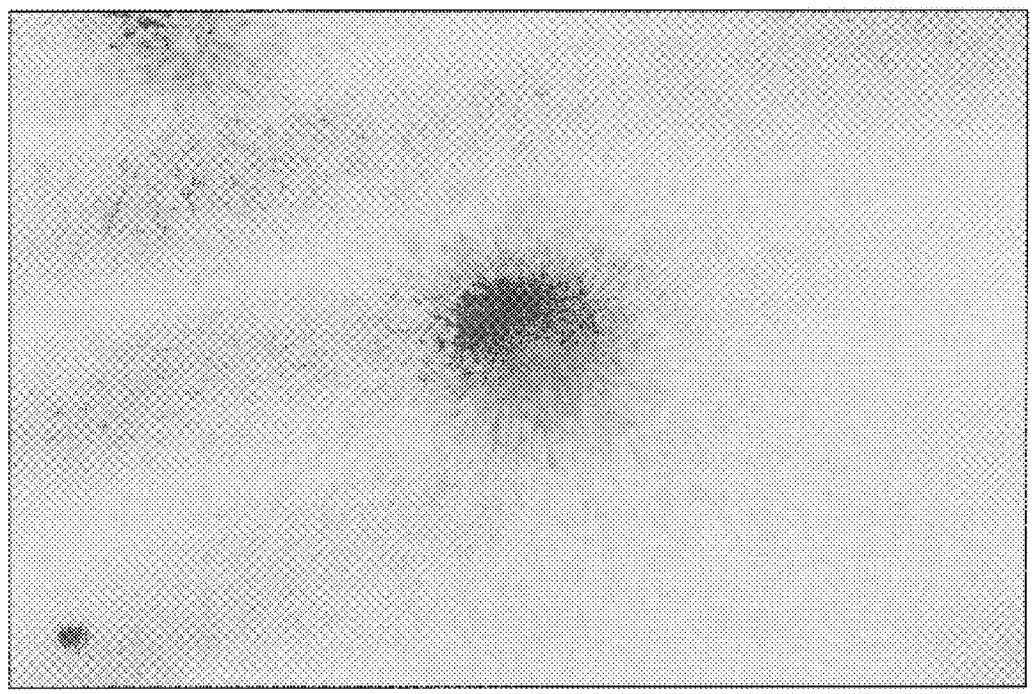
FIG. 2 shows a micrograph of fission tracks generated in a polycarbonate sheet by neutron irradiation of a single microsize particle of natural uranium oxide.

After the neutron irradiation process the entire tape is etched in an appropriate etching medium such as NaOH. This etching enhances the tracks. FIG. 2 shows an example of tracks from one particle.

The next step is a first visual screening in order to eliminate samples from further consideration which apparently have not produced any tracks or only tracks which can be attributed to natural uranium. These samples are considered free of any actinides. The remaining samples are then analyzed under an optical or electron microscope in order to determine the size of particles which have given rise to tracks. These tracks show in general a starlike configuration in the organic sheet (see FIG. 2). The density of tracks around the center of the particle depends on the size of the particle, on the enrichment in fissile actinides (e.g. U-235), on the irradiation time and the neutron fluence.

Figure 1:
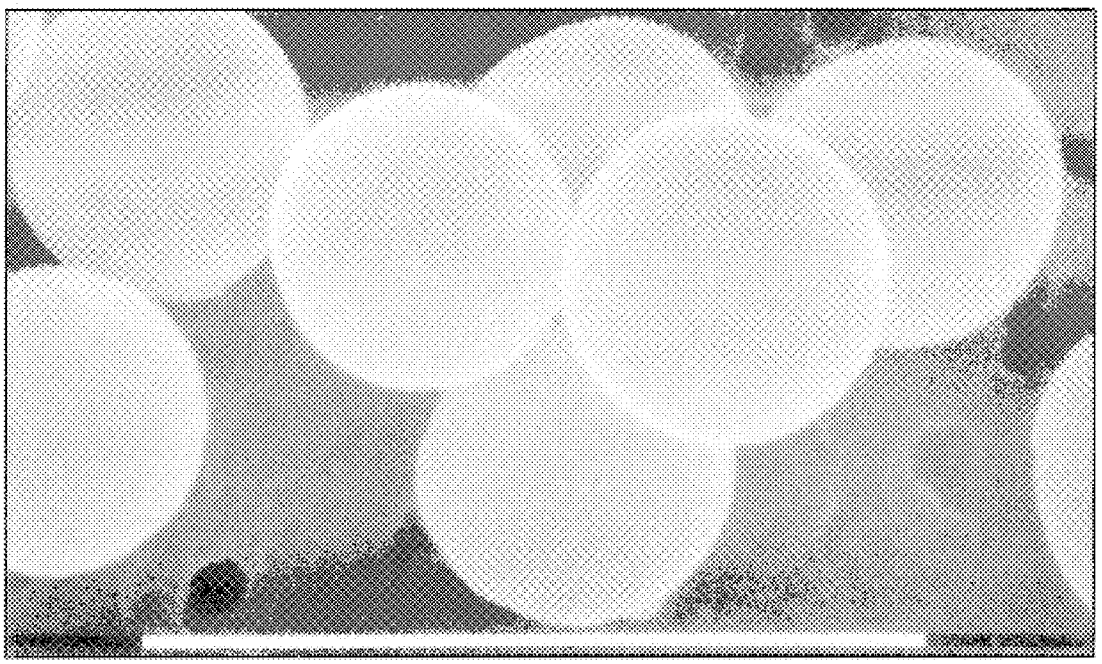
FIG. 1 shows a micrograph of some monodispersed standard size particles.
Figure 3:
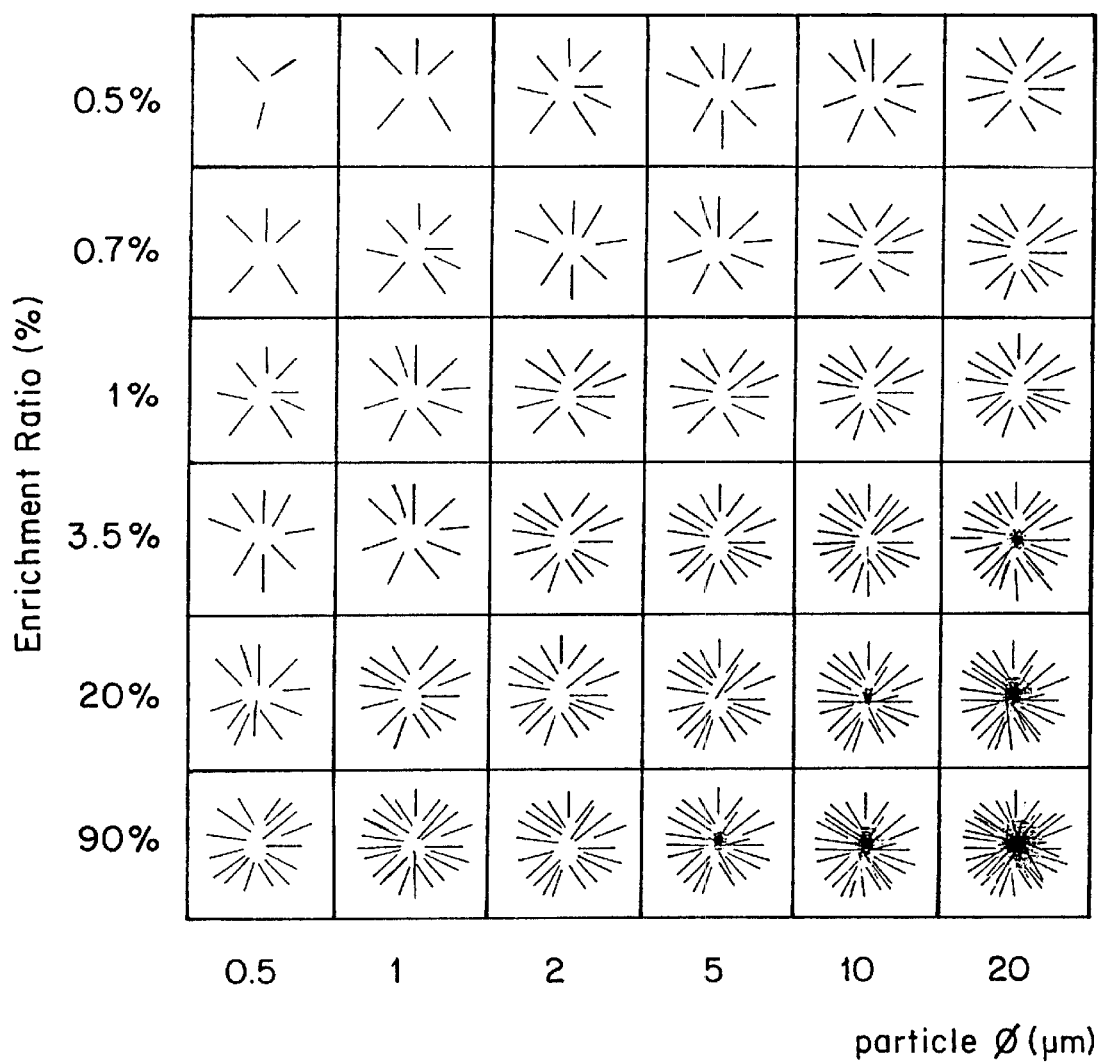
FIG. 3 is a schematic view of a standard chart for use in the present invention.

The step revealing the enrichment of the respective particle is constituted by a comparison of the track density around the center of the particle with a standard chart on which a large number of stars is represented. An example of such a chart for uranium is schematically shown in FIG. 3. The stars have been obtained by the same fission track process applied to standard particles of well defined stepped sizes and enrichment ratios. FIG. 1 shows a micrograph of some standard particles of about 4 μm diameter which can be used to establish this chart. Preferably the stars of this chart are arranged in lines and columns, one ordinate being associated to size and the other to the enrichment ratio. The steps relating to size should be adapted to the sizes of U-235 particles which are expected to be found in the samples. The steps relating to the enrichment ratio are selected according to the mission to be accomplished: It might be useful to provide small steps around the natural isotope ratio and coarse steps for high enrichment rations as those particles will in any case be further studied by mass spectrometry.

The star whose track density corresponds best to that of the (analyzed particle in the selected size ordinate allows to determine the enrichment ratio U-235 to U-238. In particular there might be marked on the chart a zone of images corresponding to natural uranium (having an enrichment ratio of about 0.7 to 99.3). Stars not corresponding to this zone will be isolated and analyzed more closely by mass spectrometry, such as Secondary Ion Mass Spectrometry (SIMS).

A particular feature of the method according to the invention is that unnecessary expensive analytical work such as SIMS is avoided and only reserved to a small number of suspect samples with abnormal enrichment rations.

Another advantage is that the samples are collected and sandwiched between organic sheets on the spot and do not need a clean laboratory which otherwise would be necessary when using other analytical techniques.

Finally the method according to the invention does not destroy the samples. After neutron irradiation and etching, samples which have not been perused for the SIMS process can be stored in archives and can be verified afterwards.

Although the invention has been conceived for the analysis of environmental samples revealing non-declared nuclear activities, it should be understood that it can also be applied to routine safeguard and installation monitoring purposes. In such applications other radionuclides than U-235 can be of interest, such as plutonium. Of course, the chart must be adapted to fit for other nuclides. For example, a specific standard fission track chart should be prepared for plutonium with images of the typical alpha tracks produced by plutonium particles.

The tracks of alpha particles can be separated from those of fission products. To achieve this, one organic sheet of the sandwich structure is covered on the inner side with a thin foil of a material stopping the fission products. Thus, a layer of gold having a thickness of a 8 μm and evaporated onto one of the organic sheets, will stop all fission fragments whereas alpha particles pass there-through and can still produce tracks in the underlying sheet. As a result, these tracks correspond to alpha particles only whereas the opposite sheet of the sandwich structure shows tracks due both to these alpha particles and to fission products.

The visual analysis of the tracks (size measurement and comparison with the chart) can be replaced by an automatic system of optical evaluation. In this case the standard chart is replaced by a corresponding set of data in the form of a computer fitting program concerning the characteristics of the different stars. Similar programs exist already for fitting X-ray diffraction, mass spectrometry and others. This would speed up the evaluation of the large number of samples on a spool and increase the reliability of the method.

What is claimed is:

1. A method for the quantitative determination of fissile material content in small size particles present in samples wherein:

the samples are sandwiched in organic sheets and then submitted to a defined thermal neutrons fluence whereupon fission products of the fissile material in the sample create fission tracks in the sheets, the tracks are enhanced by a chemical etching process, the size of selected particles having created such tracks is determined by means of a microscope, and thereafter these visible tracks of said selected particles are compared to pre-established standard tracks obtained by the same process from particles of different stepped down size and enrichment ratio.

2. A method according to claim 1, wherein many distinct samples are collected on a common carrier tape and are submitted simultaneously to the neutron flux.

3. A method according to claim 1 or 2, wherein the fission tracks are interpreted by an automated image processing treatment using reference data derived from said pre-established standard tracks.

4. A method according to claim 1 or 2, wherein samples are sandwiched between a first organic sheet which is covered on the side of the ,sample with a metal foil, and a second organic sheet without such foil, in order to permit both the analysis of alpha tracks and that of fission products.

* * * * *